(12) United States Patent
Olliver

(10) Patent No.: US 9,527,533 B2
(45) Date of Patent: Dec. 27, 2016

(54) MOTOR VEHICLE HAVING A REAR ENGINE AND COMPRISING AN IMPROVED FRONT COMPARTMENT

(71) Applicant: RENAULT s.a.s., Boulogne-Billancourt (FR)

(72) Inventor: Mathieu Olliver, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/441,990

(22) PCT Filed: Nov. 7, 2013

(86) PCT No.: PCT/EP2013/073241
§ 371 (c)(1),
(2) Date: Jun. 3, 2015

(87) PCT Pub. No.: WO2014/075986
PCT Pub. Date: May 22, 2014

(65) Prior Publication Data
US 2015/0298743 A1 Oct. 22, 2015

(30) Foreign Application Priority Data
Nov. 13, 2012 (FR) ...................................... 12 60780

(51) Int. Cl.
*B62D 25/08* (2006.01)
*B60H 1/00* (2006.01)
(Continued)

(52) U.S. Cl.
CPC ........... *B62D 25/08* (2013.01); *B60H 1/00507* (2013.01); *B60K 1/04* (2013.01);
(Continued)

(58) Field of Classification Search
CPC ................. B60K 2001/0411; B60K 2005/003; B60K 2005/006; B60T 17/04; B60T 17/043; B60T 17/046; B62D 3/12; B62D 3/123; B62D 3/126
See application file for complete search history.

(56) References Cited

U.S. PATENT DOCUMENTS 6,874,602 B2 * 4/2005 Greaves, Jr. .......... B60T 17/223
188/112 R
7,311,365 B2 * 12/2007 Nohira .................... B60T 8/368
303/119.1

FOREIGN PATENT DOCUMENTS

DE    10 2010 002 569      9/2010
EP           0779204 A1 *  6/1997 ............. B60G 99/00
(Continued)

OTHER PUBLICATIONS

International Search Report Issued Nov. 26, 2013 in PCT/EP13/073241 filed Nov. 7, 2013.
(Continued)

*Primary Examiner* — Katy M Ebner
(74) *Attorney, Agent, or Firm* — Oblon, McClelland, Maier & Neustadt, L.L.P.

(57) ABSTRACT

The invention relates to a motor vehicle that includes a rear compartment, containing a power train of the motor vehicle, and a front compartment including: a first area which is located on the right for a vehicle driven on the right, or located on the left for a vehicle driven on the left, and which receives at least one steering column, a brake servo, and main rigid brake lines; and a second area which is located on one side of the vehicle, opposite the first area, and which receives at least one battery, characterized in that the front compartment includes a third area which is located between
(Continued)

the first and second areas and which receives at least one hydraulic brake unit and secondary rigid brake lines.

12 Claims, 2 Drawing Sheets

(51) Int. Cl.
*B60K 1/04* (2006.01)
*B60T 17/04* (2006.01)
*B60K 5/00* (2006.01)

(52) U.S. Cl.
CPC ............... *B60K 5/00* (2013.01); *B60T 17/04* (2013.01); *B62D 25/088* (2013.01); *B60K 2001/0411* (2013.01); *B60K 2005/006* (2013.01)

(56) References Cited

FOREIGN PATENT DOCUMENTS

| | | |
|---|---|---|
| JP | 03 25063 | 2/1991 |
| JP | 06 32250 | 2/1994 |
| JP | 06 219256 | 8/1994 |

OTHER PUBLICATIONS

French Search Report Issued May 31, 2013 in Application No. FR 1260780 filed Nov. 13, 2012.

\* cited by examiner

MOTOR VEHICLE HAVING A REAR ENGINE AND COMPRISING AN IMPROVED FRONT COMPARTMENT

BACKGROUND

The invention relates to a motor vehicle.

The invention relates more particularly to a motor vehicle which comprises a rear compartment containing a drivetrain of the motor vehicle, and a front compartment comprising:
a first zone arranged on the right for a right-hand drive vehicle or arranged on the left for a left-hand drive vehicle, receiving at least one steering column, a braking assistance servomotor and primary rigid brake pipes, and
a second zone arranged on the opposite side of the vehicle to said first zone, receiving at least one battery.

Numerous examples of vehicles of this type are known.

In such rear-engine vehicles, the front compartment is generally small and serves no other purpose than to constitute an impact absorption zone which is able to dissipate the energy released in the event of an impact by crumpling said zone.

The functional elements of such vehicles are, moreover, distributed within the vehicle with no real coherence depending on the zones left available.

Thus, it is for example common to find such vehicles in which elements such as the braking members are arranged beneath a floor of the vehicle, in locations which are particularly exposed to weather and/or to impacts with foreign bodies, which is particularly harmful to the reliability of such members and more generally to the safety of the vehicle and of its occupants.

Furthermore, the placement of the various elements is not optimized as a function of the driving side of the vehicle.

Indeed, conventionally, right-hand drive vehicles have functional elements whose placement is completely different to that of the functional elements of left-hand drive vehicles. However, the differential placement of all the elements either makes it impossible to produce both types of vehicles on a single production line or gives rise to substantial additional production costs.

It is therefore expedient to minimize these additional costs by having two types of vehicles—either left-hand drive or right-hand drive—comprising the greatest possible number of elements whose position does not change.

BRIEF SUMMARY

To that end, the invention proposes a vehicle of the type described above, comprising a large number of elements whose placement is optimized.

To that end, the invention proposes a motor vehicle of the type described above, characterized in that the front compartment comprises a third zone which is arranged between the first and second zones, and which receives at least one braking hydraulic block, and secondary rigid brake pipes.

According to other features of the invention:
the third zone contains a vehicle steering rack which extends into the first and the second zones so as to be associated, selectively, with an installed steering of the vehicle, installed on the left or on the right,
the first zone contains a clutch hydraulic circuit and the second zone contains a reservoir for windshield washer fluid,
the steering rack bears an assistance motor arranged on the same side as the steering column of the vehicle,
the third zone contains a cooling exchanger, cooling pipes and a container of coolant,
the container of coolant is arranged in an upper central part of the front compartment,
the third zone contains:
a fuse and relay box,
a wiring loom and a grommet for passing through the firewall of the vehicle,
the third zone contains elements of the heating and air conditioning system of the vehicle, comprising at least:
first air conditioning pipes,
second pipes for connecting to an air heat exchanger,
the cooling exchanger and the cooling pipes are arranged in a front part of the front compartment,
the wiring loom and the grommet for passing through the firewall of the vehicle are arranged in a central part of the firewall of the vehicle and the fuse and relay box is mounted over them,
the hydraulic braking block and the rigid secondary brake pipes are arranged in a central part of the front compartment.

BRIEF DESCRIPTION OF THE DRAWINGS

Other features and advantages of the invention will emerge upon reading the following detailed description, for the comprehension of which reference is made to the appended drawings, in which.

DETAILED DESCRIPTION

In the figures, identical reference numbers designate elements which are identical or which have similar functions.

Figure 1:
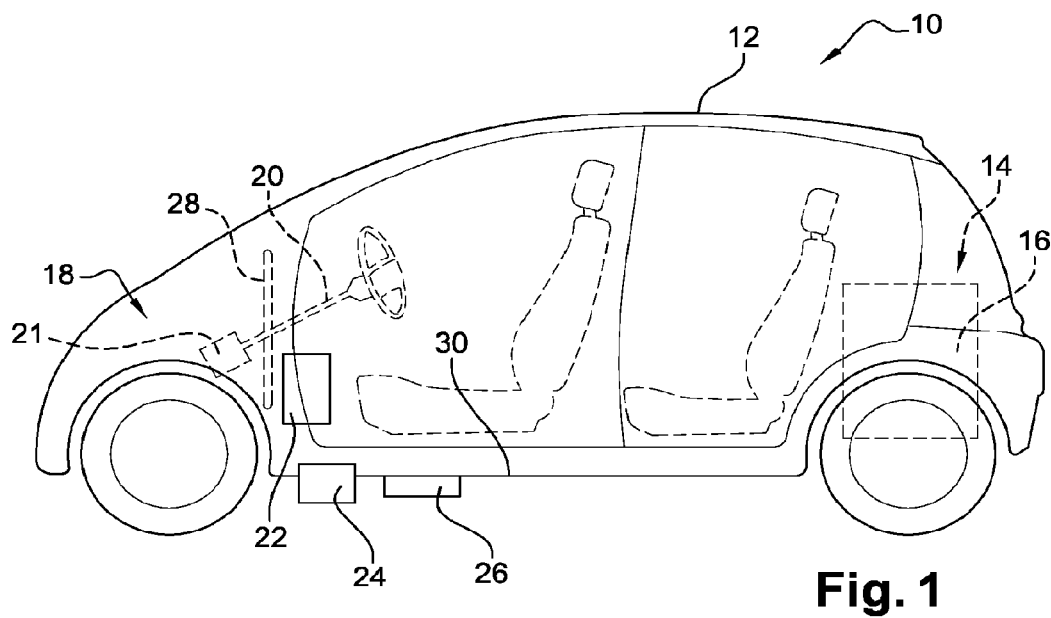
FIG. 1 is a schematic view in section of a vehicle according to the prior art.

FIG. 1 shows a motor vehicle 10 according to the prior art.

The vehicle 10 comprises a body structure element 12 which comprises a rear compartment 14 and a front compartment 18. The rear compartment 14 receives a drivetrain 16 of the motor vehicle and the front compartment 18 forms an impact-absorbing zone.

As is known, the vehicle 10 receives various elements.

As shown in a simplified manner in FIG. 1, the vehicle 10 receives elements of a steering system of the vehicle, in particular a steering column 20 and a steering rack 21 of the vehicle, with the placement of the column 20 depending in particular on the driving side of the vehicle: on the right for a right-hand drive vehicle and on the left for a left-hand drive vehicle.

The vehicle which has been represented in FIG. 1 further comprises for example a battery 22, a braking assistance servomotor 24 and a braking assistance hydraulic block 26, comprising for example internally a vehicle trajectory control device or ESP.

As shown in FIG. 1, the arrangement of these elements is not optimized.

In particular, the battery 22 is for example located essentially behind a firewall 28 of the vehicle, and the braking assistance servomotor 24 as well as the braking hydraulic block 26 are located beneath a floor 30 of the vehicle.

This configuration is particularly prejudicial to the reliability of said elements since, in particular as concerns the servomotor 24 and the braking hydraulic block 26, the latter are subjected to water spray from the road and may, moreover, be affected by foreign bodies also originating from the road.

Furthermore, in the context of large-scale mass production, it is expedient to be able to produce, on the same production line, vehicles 10 which are either right-hand drive or left-hand drive, while minimizing costs.

However, in most currently known designs, placement of right-hand drive or left-hand drive gives rise to general upheaval of the placement of the elements, such that it is not possible to benefit from assembly operations which are common to the two types of vehicle, and such that it is then necessary for production to take place either on two different lines or on an almost unit-by-unit and manual basis on the same line.

The invention solves this drawback by proposing, on one hand, an optimized design of a rear-engine vehicle 10 in which the various elements are grouped substantially in the front compartment and, on the other hand, in which the differentiation of the elements, depending on whether they are intended for right-hand drive vehicles or for left-hand drive vehicles, is minimal.

Figure 2:
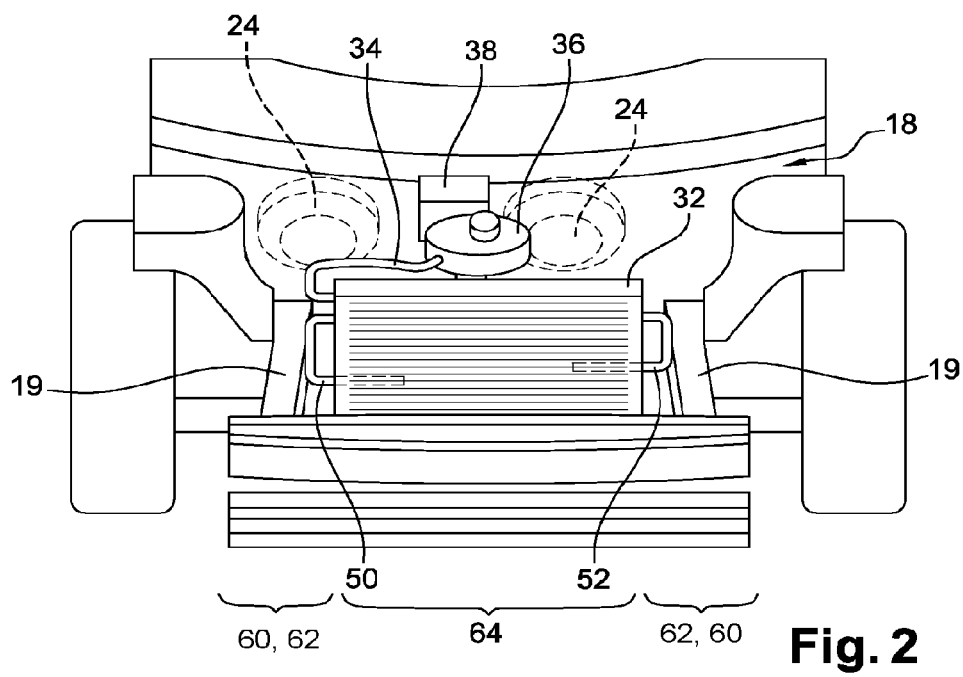
FIG. 2 is a view from above of a front compartment of a vehicle according to the invention.
Figure 3:
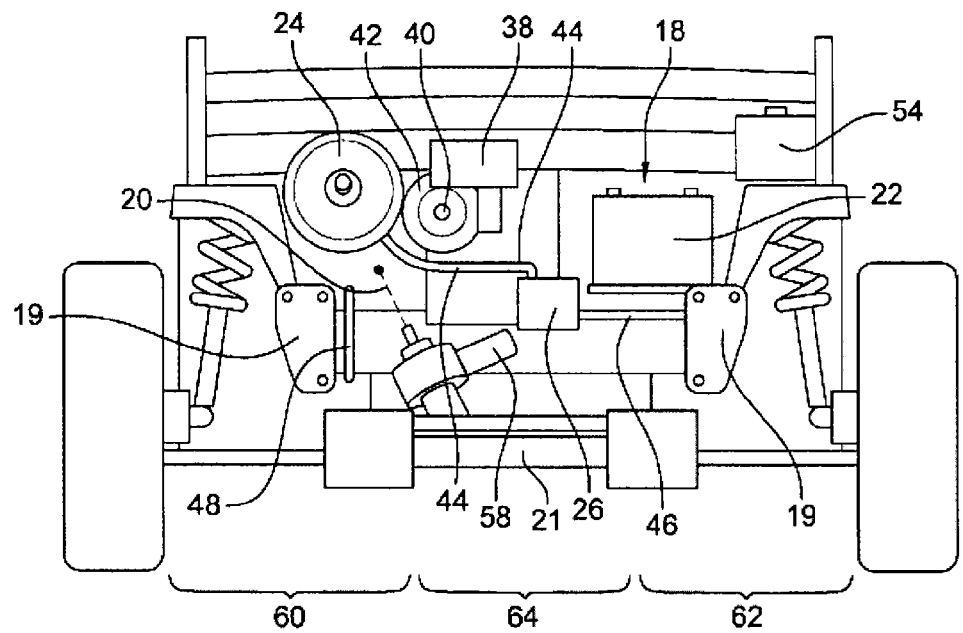
FIG. 3 is an end view of a front compartment of a right-hand drive vehicle according to the invention.
Figure 4:
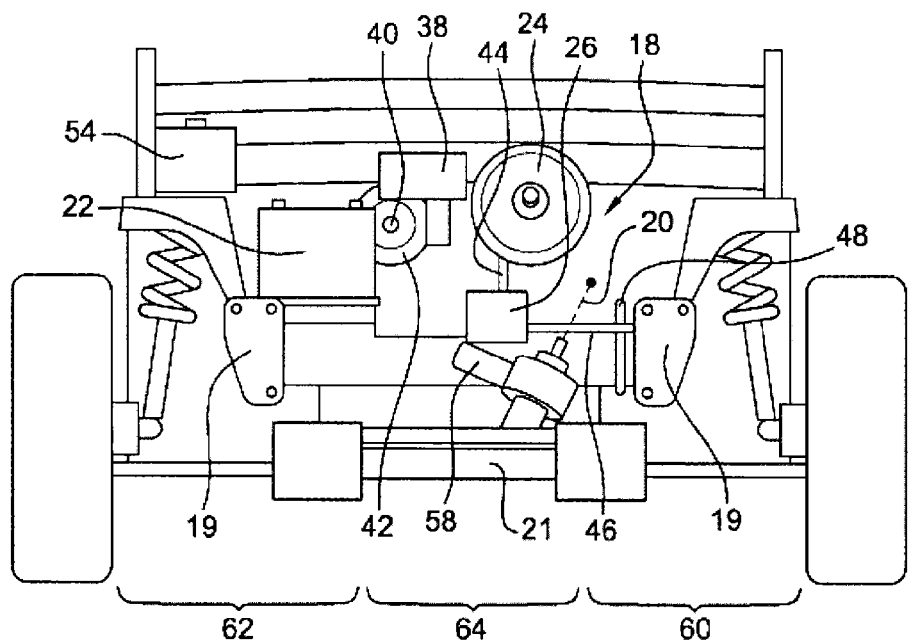
FIG. 4 is an end view of a front compartment of a left-hand drive vehicle according to the invention.

According to this design, as shown in FIGS. 2 to 4, the vehicle 10 also receives, in its front compartment 18 delimited by two rails 19, a first zone 60 arranged on the right for a right-hand drive vehicle or arranged on the left for a left-hand drive vehicle, receiving at least one steering column 20, a braking assistance servomotor 24 and primary rigid brake pipes 44.

The first zone 60 may also contain a clutch hydraulic circuit 48.

On a side of the vehicle opposite said first zone 60, the vehicle 10 has a second zone 62 receiving at least one battery 22. The second zone may also contain a reservoir 54 for windshield washer fluid.

In accordance with the invention, the front compartment 18 comprises a third zone 64 which is arranged between the first zone 60 and the second zone 62, and which receives a great number of elements which may equally be mounted at the same locations in the front compartment, whether the vehicle is a right-hand drive vehicle or a left-hand drive vehicle.

Thus, in accordance with the invention, the third zone comprises at least one hydraulic braking block 26 and rigid secondary brake pipes 46.

As shown in FIGS. 3 and 4, the hydraulic braking block 26 and the rigid secondary brake pipes 46 are preferably arranged in a central part of the front compartment.

Moreover, the third zone contains a vehicle steering rack 21 which extends into the first zone 60 and the second zone 62 and which may be associated, selectively, with an installed steering of the vehicle, installed on the right as shown in FIG. 3 or on the left as shown in FIG. 4.

Thus, the steering rack 21 bears an assistance motor 58 which is arranged in the first zone on the same side as the steering column 20 of the vehicle.

The third zone 64 also comprises a cooling exchanger 32 and cooling pipes 34 and a container 36 of coolant associated therewith.

As shown in FIG. 2, the container 36 of coolant is arranged in an upper central part of the front compartment. This configuration allows it to be always accessible.

The third zone also contains electrical members, which are a fuse and relay box 38, a wiring loom 40 and a grommet 42 for passing through the firewall of the vehicle.

More particularly, the wiring loom 40 and the grommet 42 for passing through the firewall 28 of the vehicle are arranged in a central part of the firewall 28 of the vehicle and the fuse and relay box is mounted over them.

The third zone contains elements of the heating and air conditioning system of the vehicle, comprising at least first air conditioning pipes 50 and second pipes 52 for connecting to an air heat exchanger.

Preferably, as shown in FIG. 2, the cooling exchanger 32 and the cooling pipes 34 are arranged in a front part of the front compartment 18.

The invention thus makes it possible to group those elements which are essential to the operation of the vehicle in a front part 18 of the vehicle where they are protected from the weather.

For all that, the low mechanical strength of these elements does not impair the crumple properties of said front part 18 of the vehicle 18 in the event of an impact.

The invention thus proposes an advantageous arrangement of a rear-engine vehicle comprising a small front compartment.

The invention claimed is:

1. A motor vehicle, comprising:
   a rear compartment containing a drivetrain of the motor vehicle; and
   a front compartment comprising:
      a first zone arranged on the right for a right-hand drive vehicle or arranged on the left for a left-hand drive vehicle, receiving at least one steering column, a braking assistance servomotor and primary rigid brake pipes, and
      a second zone arranged on the opposite side of the vehicle to said first zone, receiving at least one battery,
   wherein the front compartment comprises a third zone which is arranged between the first and second zones, and which receives at least one braking hydraulic block, and secondary rigid brake pipes.

2. The vehicle as claimed in claim 1, wherein the third zone contains a vehicle steering rack which extends into the first and the second zones so as to be associated, selectively, with the steering column of the vehicle, installed on the left or on the right.

3. The vehicle as claimed in claim 1, wherein the first zone contains a clutch hydraulic circuit and the second zone contains a reservoir for windshield washer fluid.

4. The vehicle as claimed in claim 2, wherein the steering rack bears an assistance motor arranged on the same side as the steering column of the vehicle.

5. The vehicle as claimed in claim 1, wherein the third zone contains a cooling exchanger, cooling pipes and a container of coolant.

6. The vehicle as claimed in claim 5, wherein the container of coolant is arranged in an upper central part of the front compartment.

7. The vehicle as claimed in claim 1, wherein the third zone contains:
   a fuse and relay box, and
   a wiring loom and a grommet for passing through the firewall of the vehicle.

8. The vehicle as claimed in claim 1, wherein the third zone contains elements of the heating and air conditioning system of the vehicle, comprising at least:
first air conditioning pipes, and
second pipes for connecting to an air heat exchanger.

9. The vehicle as claimed in claim 5, wherein the cooling exchanger and the cooling pipes are arranged in a front part of the front compartment.

10. The vehicle as claimed in claim 7, wherein the wiring loom and the grommet for passing through the firewall of the vehicle are arranged in a central part of the firewall of the vehicle and the fuse and relay box are mounted over them.

11. The vehicle as claimed in claim 1, wherein the hydraulic braking block and the rigid secondary brake pipes are arranged in a central part of the front compartment.

12. A pair of motor vehicles, comprising:
a right-hand drive vehicle, including
　a rear compartment containing a drivetrain of the right-hand drive vehicle, and
　a front compartment comprising:
　　a first zone arranged on the right of the right-hand drive vehicle, receiving at least one steering column, a braking assistance servomotor, and primary rigid brake pipes,
　　a second zone arranged on the opposite side of the right-hand drive vehicle to said first zone of the right-hand drive vehicle, receiving at least one battery, and
　　a third zone arranged between the first and second zones of the right-hand drive vehicle, and which receives at least one braking hydraulic block and secondary rigid brake pipes;
a left-hand drive vehicle, including
　a rear compartment containing a drivetrain of the left-hand drive vehicle, and
　a front compartment comprising:
　　a first zone arranged on the left of the left-hand drive vehicle, receiving at least one steering column, a braking assistance servomotor, and primary rigid brake pipes,
　　a second zone arranged on the opposite side of the left-hand drive vehicle to said first zone of the right-hand drive vehicle, receiving at least one battery, and
　　a third zone arranged between the first and second zones of the left-hand drive vehicle, and which receives at least one braking hydraulic block and secondary rigid brake pipes.

* * * * *